United States Patent [19]

Cunard et al.

[11] Patent Number: 5,088,633
[45] Date of Patent: Feb. 18, 1992

[54] BIKE HELMET HOLDING SYSTEM

[75] Inventors: Joel C. Cunard, Bedford; Paula W. Prescott, Everett, both of Pa.

[73] Assignee: Hedstrom Corp., Bedford, Pa.

[21] Appl. No.: 672,116

[22] Filed: Mar. 19, 1991

[51] Int. Cl.⁵ .............................. B62J 7/00; B62J 7/06
[52] U.S. Cl. ...................................... 224/30 A; 224/36
[58] Field of Search ........ 224/276, 30 A, 42, 42.46 R, 224/36; 2/421, 422, 425, 271; 24/3 D, 265; 280/288.4, 304.5, 769

[56] References Cited

U.S. PATENT DOCUMENTS

| | | | |
|---|---|---|---|
| 586,294 | 7/1897 | Stephenson | 224/30 A |
| 3,399,855 | 9/1968 | Shirai | 280/288 X |
| 4,744,573 | 5/1988 | Most | 280/288.4 X |
| 5,005,220 | 4/1991 | Gaiatto, et al. | 2/421 |

Primary Examiner—Henry J. Recla
Assistant Examiner—David J. Walczak
Attorney, Agent, or Firm—Cesari & McKenna

[57] ABSTRACT

A helmet holding system for a bicycle comprises a pair of hooks spaced apart along the handlebars of the bike and a special chin strap on the helmet which incorporates eyelets spaced apart along the length of the strap. The eyelets can be hooked onto the hooks so as to releasably suspend the helmet by its strap in front of the handlebars so that the helmet is available for use by the bicycle rider.

2 Claims, 1 Drawing Sheet

ID-shaped with
BIKE HELMET HOLDING SYSTEM

This invention relates to a children's bicycle and to a safety helmet for the rider thereof. It relates more particularly to a system for removably attaching the helmet to the bike when the helmet is not in use.

BACKGROUND OF THE INVENTION

As the nation becomes more safety conscience, various states are considering enacting regulations to require children to wear safety helmets while riding their bicycles. Accordingly, it is of some importance to try to ensure that the helmet is close by the bicycle when the child chooses to take a ride. The current practice in this regard is rather haphazard. Some children hook the chin straps of their helmets over the bicycle handle bars. In the case of bikes with baskets, the helmets may be deposited in the baskets. Usually, however, since there is no definite way to secure the helmet to the bike, the helmet is thrown on the floor or ground and very often is lost.

SUMMARY OF THE INVENTION

Accordingly, it is an object of this invention to provide a safety helmet securing system for a bicycle.

Another object of the invention is to provide an arrangement for releasably securing a safety helmet to a specific location on a bicycle.

A further object of the invention is to provide a system such as this which does not detract from the appearance of the bicycle.

A further object of the invention is to provide a bike helmet attachment system which encourages a child to use the safety helmet.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

Briefly, the present system releasably attaches a safety helmet to the handle bars of a bicycle. The helmet has a special chin strap incorporating a pair of fastener elements spaced along the chin strap which can be engaged to a pair of cooperating fastener elements spaced apart along the handlebars. When the cooperating fastener elements are so engaged, the helmet is suspended from the handlebars by its chin strap so that the helmet crown faces forwardly creating a decorative feature at the front of the bike. The helmet and bike may also be color coordinated to optimize the ornamental appearance of the combination which is desirable from a marketing standpoint.

BRIEF DESCRIPTION OF THE DRAWING

For a fuller understanding of the nature and objects of the invention, reference should be had to the following detailed description, taken in connection with the accompanying drawing, in which.

DESCRIPTION OF THE PREFERRED EMBODIMENT

Figure 1:
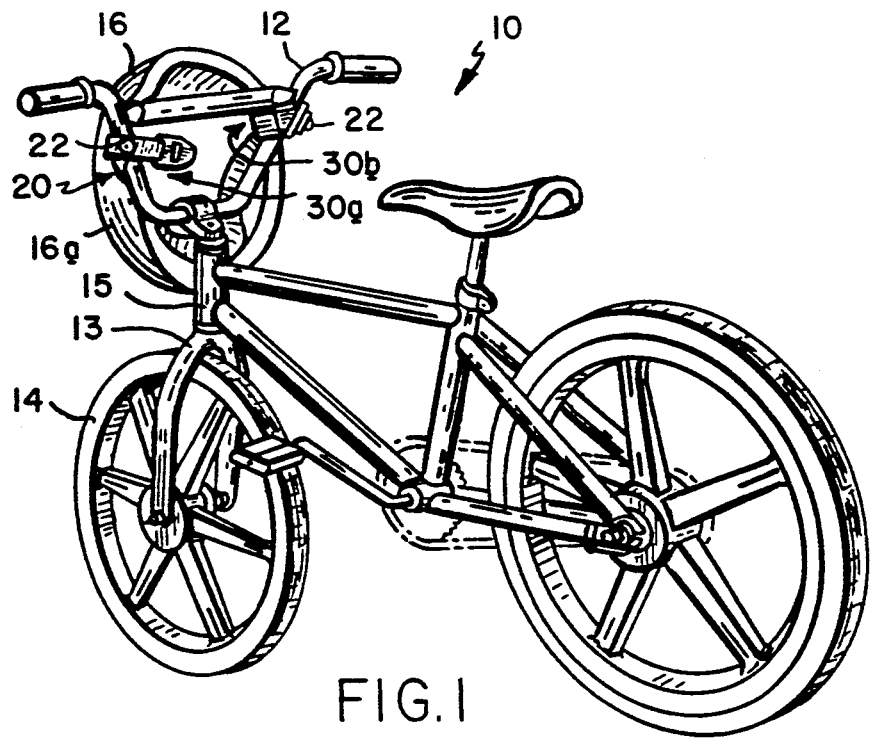
FIG. 1 is an isometric view of a bicycle incorporating my helmet holding system.

Referring to FIG. 1 of the drawing, a more or less conventional children's sidewalk bike 10 has handlebars 12 for turning the front fork 13 and front wheel 14 relative to the head post 15 in order to steer the bike. A safety helmet 16 is suspended from handlebars 12 over wheel 14 by a helmet-holding system shown generally at 20.

Figure 3:
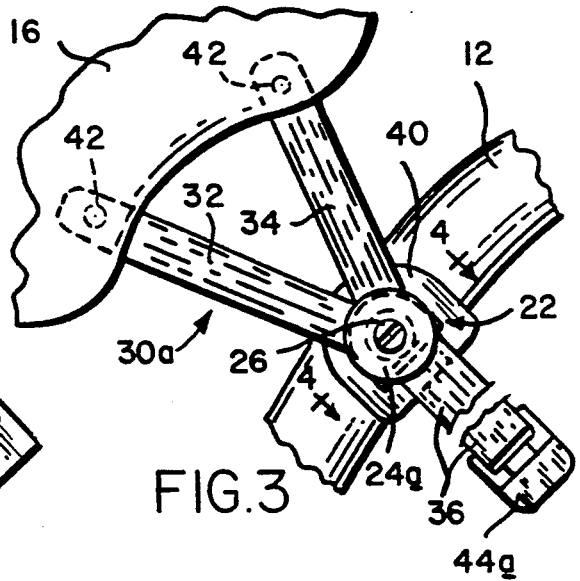
FIG. 3 is a similar view showing the operation of the FIG. 1 system.
Figure 4:
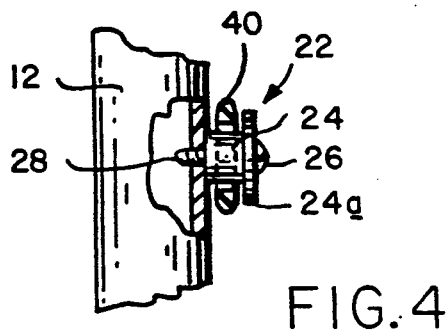
FIG. 4 is a sectional view taken along line 4—4 of FIG. 3.

As best seen in FIG. 3 and 4, holding system 20 comprises a pair of spaced-apart hooks 22 projecting rearwardly from handlebars 12 on opposite sides of headpost 15. Each hook 22 comprises a tubular bushing 24 having a radial flange or enlargement 24a at its outer end. The inner end of the bushing engages against handlebars 12 and the bushing is secured to the handlebars by a threaded fastener 26 extending through the bushing and screwed into a hole 28 in the handlebars.

The other elements of the helmet-holding system 20 are incorporated into the helmet 16 chin strap. The chin strap comprises two similar sections 30a and 30b secured to opposite sides of the helmet 16. As shown in FIG. 3, section 30a comprises three strap segments 32, 34 and 36 connected by an eyelet-forming ring 40 which extends through loops formed in adjacent ends of those segments. The free ends of strap segments 32 and 34 are secured to the helmet 16 side wall by rivets 42. The free end of strap segment 36 is terminated by a buckle or connector member 44a.

Figure 2:
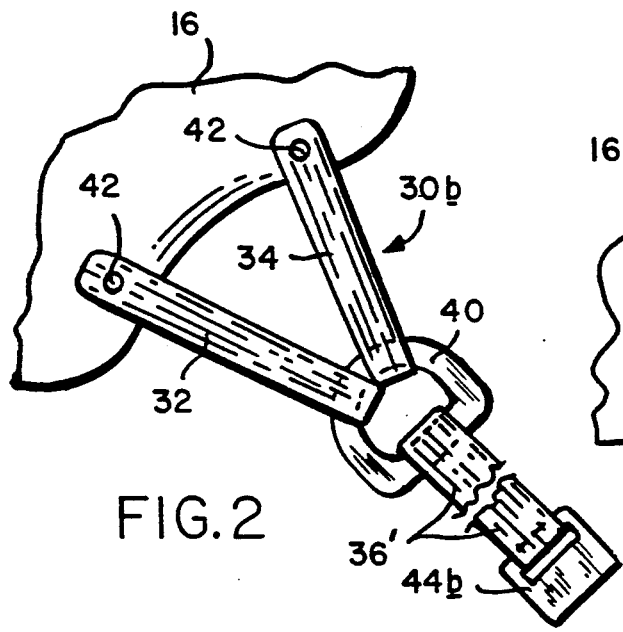
FIG. 2 is a fragmentary isometric view on a much larger scale showing a part of the FIG. 1 system in greater detail.

The chin strap section 30b at the opposite side of helmet 16, shown in FIG. 2, is identical to section 30a except that it has a strap segment 36' whose free end may be terminated by a connector member 44b that is arranged to mate with connector member 44a on strap segment 36 to secure the chin strap under the chin of the helmet wearer.

As best seen in FIG. 2, each ring or eyelet 40, which may be of metal or plastic, is generally D-shaped with the strap segments 32 and 34 extending from the curved portion of the ring and the segment 36, 36' being engaged around the straight portion thereof. The inner "diameter" of ring 40 is slightly larger than the diameter of the bushing flange 24a and is stiff, but somewhat flexible, so that the ring can be hooked onto bushing 24 and be forced into place behind the bushing flange 24a as shown in FIGS. 3 and 4. Some deformation of ring 40 may be required to seat the ring on the bushing.

The lengths of the strap segments 32 and 34 of each strap section 30a and 30b are selected such that when the helmet 16 is positioned with its bottom edge engaging the front of handlebars 12, as shown in FIG. 1, the two strap sections 30a and 30b can be pulled rearwardly and wrapped around the handlebars, allowing the rings 40 to be engaged onto the two hooks 22 on the handlebars 12. When the rings are so engaged, the strap sections 30a and 30b hold helmet 16 against the front of the handlebars 12 at a selected elevation above the bike wheel 14, the helmet being centered on the head post 15 with its crown 16a facing forwardly or in the same direction as the wheel.

When the child decides to ride the bike, the helmet can be released easily from the handlebars by pulling rearwardly and outwardly on the free ends of strap segments 36 which will detach rings 40 from bushings 24 of hooks 22.

As will be seen from the foregoing, the presence of the helmet holding system 20 maximizes the chances of the helmet 16 being available for use when a child decides to ride the bike 10. The system also minimizes the chances of the helmet being lost or stolen. In addition, the helmet forms an ornament at the front of the bike. For marketing purposes, the helmet can be color coordinated with the bike finish to give the overall product a very distinctive appearance.

While we have described the present helmet-holding system in the context of a children's bike, it is obvious that a similar system may be provided for adult bicycles, motorcycles and the like.

It will thus be seen that the objects set forth, among those made apparent from the preceding description, are efficiently attained. Also, certain changes may be made in the above description without departing from the scope of the invention. For example, the locations of the hooks and eyelets may be reversed so that the eyelets are formed in handlebars 12 and the hooks are part of strap sections 30a and 30b. Therefore, it is intended that all matter contained in the above description or shown in the accompanying drawing shall be interpreted as illustrative and in a limiting sense.

It is also to be understood that the following claims are intended to cover all of the generic and specific features of the invention herein described.

What is claim is:

1. A helmet holding system comprising
   a vehicle having handlebars;
   a safety helmet having a crown and opposite sides;
   a chin strap composed of two cooperating sections, each said section having corresponding first and second ends;
   means for connecting the corresponding first ends of said strap sections to opposite sides of said helmet;
   cooperating connector means at the corresponding second ends of said strap sections for releasably coupling said strap section second ends under the chin of a wearer of the helmet;
   means defining a pair of first fastener elements at spaced-apart locations on the handlebars,
   means defining a pair of second fastener elements at selected locations on said two strap sections such that when the first and second strap sections are wrapped around the handlebars at the locations of said first fastener elements thereon, said second-fastener elements can be fastened to corresponding ones of said first fastener elements so that the helmet is suspended by its strap in front of said handlebars with the helmet crown facing forwardly and wherein one of said pairs of fastener elements comprises hooks and the other comprises eyelets.

2. The system defined in claim 1 wherein the spacing of said first fastener elements is comparable to the spacing of the helmet sides.

* * * * *